BINARY COUNTER WITH FAST CARRY

Filed Sept. 30, 1954 3 Sheets-Sheet 1

INVENTORS
GEORGE D. BRUCE
PAUL F. ECKELMAN
BY
J. E. Henninger
ATTORNEY

BINARY COUNTER WITH FAST CARRY

Filed Sept. 30, 1954 3 Sheets-Sheet 2

INVENTORS
GEORGE D. BRUCE
PAUL F. ECKELMAN
BY
P. E. Henninger
ATTORNEY

FIG. 4
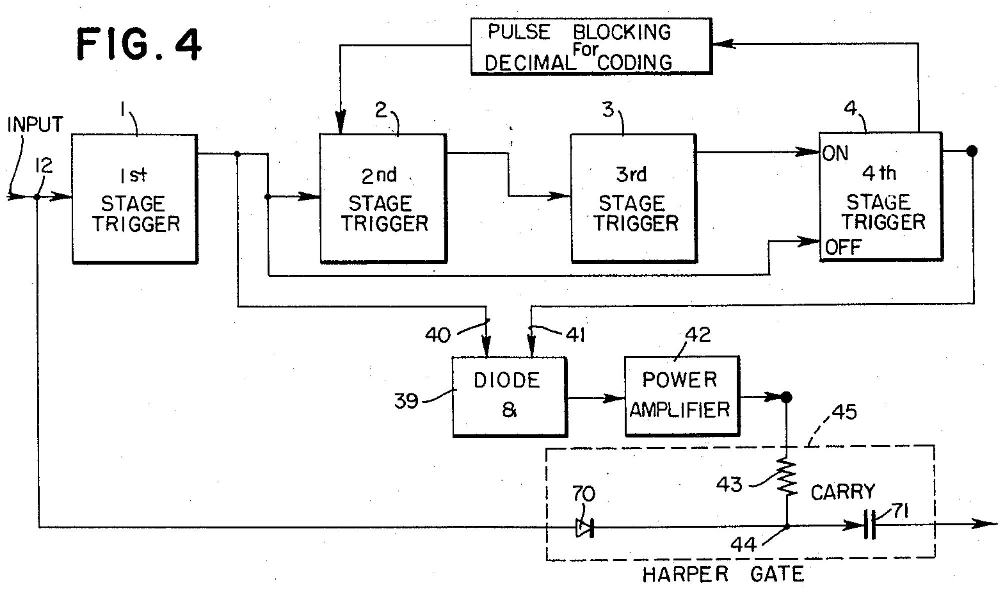
FIG. 5
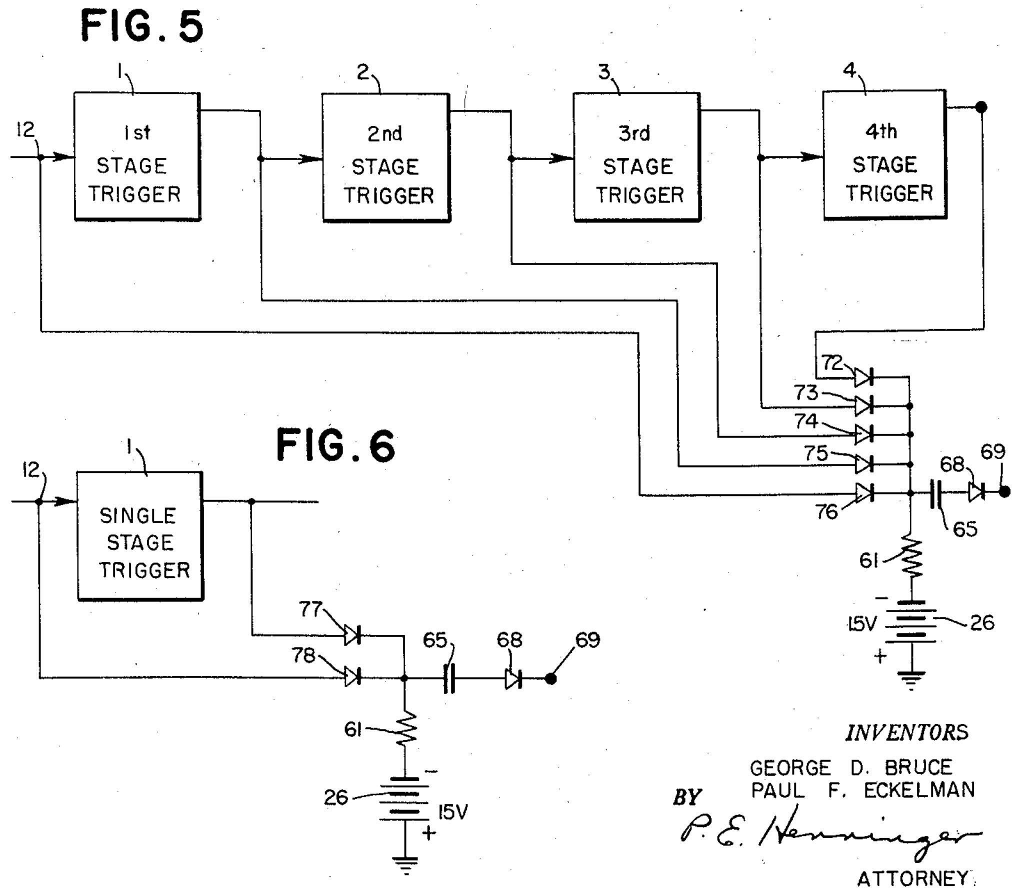
FIG. 5, FIG. 6
INVENTORS
GEORGE D. BRUCE
PAUL F. ECKELMAN
BY P. E. Henninger
ATTORNEY United States Patent Office 2,868,455

Patented Jan. 13, 1959

2,868,455

BINARY COUNTER WITH FAST CARRY

George D. Bruce, Wappingers Falls, and Paul F. Eckelman, Hyde Park, N. Y., assignors to International Business Machines Corporation, New York, N. Y., a corporation of New York Application September 30, 1954, Serial No. 459,472

1 Claim. (Cl. 235—92)

This invention relates to binary counter circuits and especially to such circuits employing transistors as translating devices.

A binary counter circuit counts successive input electrical pulses in pairs. Typically, a binary counter includes a plurality of cascaded stages, each stage comprising a binary trigger circuit shiftable between "on" and "off" states by two successive input pulses, and producing one output pulse every time it goes through its cycle from "off" to "on" and back to "off" again. Such a counter produces an output pulse upon receipt at its first stage input of a number of pulses which is equal to a power of two, the particular power of two depending upon the number of stages. Such circuits may be modified from strict binary operation to produce an output pulse upon receipt of a number of input pulses which differs from a power of two. If the modification is such that the circuit counts ten input pulses, it is termed a decimal counter.

When such a binary counter is operating in a strict binary operation, then on the last input pulse it is necessary to wait for all the stages successively to trip before an output pulse is produced. For example, if the binary counter has four stages and so counts sixteen pulses, then after the fifteenth pulse all four stages are "on." The sixteenth pulse trips the first stage "off," which in turn trips the second stage "off," which in turn trips the third stage "off," which in turn trips the fourth stage "off," and the fourth stage going "off" produces an output pulse. It may be seen that a substantial delay is required between the last input pulse and the corresponding output pulse. A decimal counter may be arranged so that only two stages trip on the last input pulse, so that the time delay is not as severe as in the strict binary counter just described. In a counter employing transistors, the delay required to trip the successive triggers is greater than where vacuum tubes are employed, since transistors are inherently slower in their response. In modern high speed computers, it is highly desirable to employ transistors, because of their lower power and lower potential requirements. In one transistor decimal counter of the type described, the tripping delay amounts to about five micro-seconds. In a modern high speed computer, such a delay is of considerable importance.

An object of the present invention is to provide a binary counter circuit with a fast carry so that the output pulse is produced substantially simultaneously with the last input pulse.

Another object is to provide an improved binary counter circuit of the type described employing transistors as translating devices.

Another object is to provide an improved binary counter circuit of the type described which is modified to produce a decimal count.

The foregoing objects are attained, in the counters disclosed herein, by providing, in combination with the counter circuit, a logical carry circuit having a number of inputs corresponding to the number of stages which are "on" at the time of the last input pulse, and an additional input to which the input pulses are directly connected. The logical circuit produces an output pulse only when all of said stages are "on," and a signal is received at said additional input. After the next to last input signal, all of the inputs of the logical circuit are connected to "on" stages, except the one directly connected to the input pulses. When the last input pulse goes into the logical circuit, an output signal is immediately produced. The signal cascades through the trigger stages as before, but the output signal goes out without waiting for completion of the cascade operation.

Other objects and advantages of the invention will become apparent from a consideration of the following specification, taken together with the accompanying drawings.

In the drawings,

Fig. 4 is another block diagram of a counter similar to that of Fig. 1, including a modification of the invention;

Fig. 5 is a block diagram of a strict binary counter embodying the invention; and Fig. 6 is a block diagram of a single stage binary counter embodying the invention.

FIGS. 1 TO 3

Figure 1:
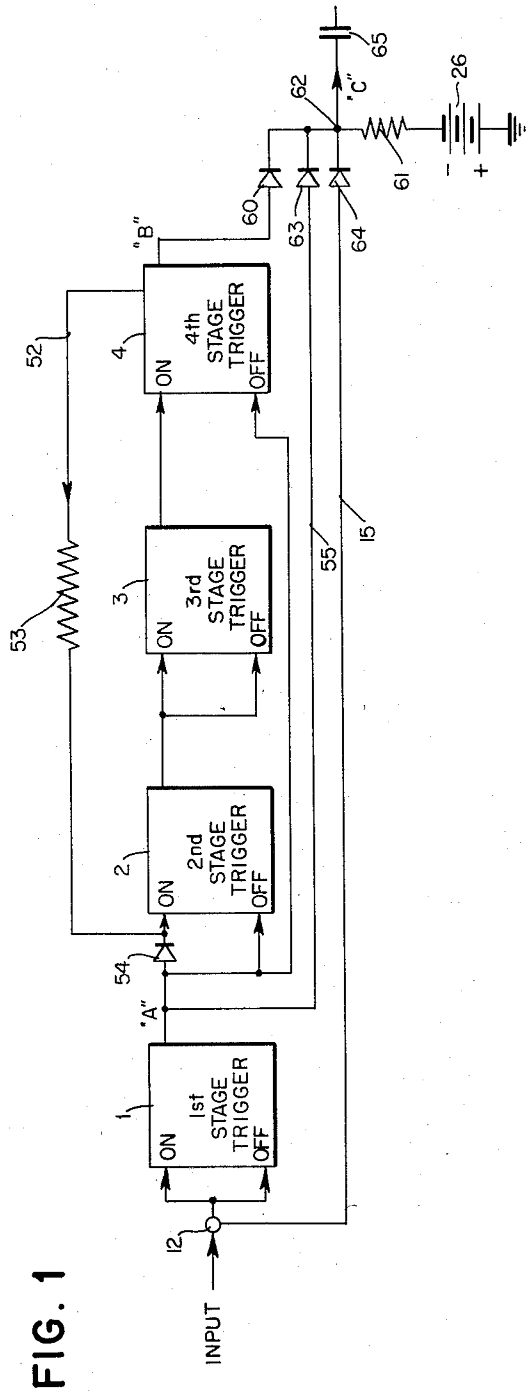
Fig. 1 is a block diagram of a decimal counter embodying the invention.

This counter will first be described with reference to the complete wiring diagram of Fig. 3. The block diagram of Fig. 1 can then be readily understood without further description.

The counter circuit includes four stages, generally indicated respectively by the reference numerals 1, 2, 3, 4. Many of the circuit elements in the four stages correspond exactly to their counterparts in the other stages. Where that correspondence exists, the same reference numerals have been applied to the corresponding circuit elements throughout the four stages. Where some difference appears, different reference numerals have been used.

The trigger circuits of stages 1, 2, 3 and 4 are more completely described and claimed in the copending application of Robert A. Henle, Raymond W. Emery, George D. Bruce and Olin L. MacSorley, Serial No. 459,381, filed September 30, 1954, now U. S. Patent No. 2,861,200, issued November 18, 1958, and will be described only briefly herein.

Referring now to stage 1, there are shown two junction transistors 5 and 6 having emitter electrodes 5*e* and 6*e*, base electrodes 5*b* and 6*b*, and collector electrodes 5*c* and 6*c*.

The two emitter electrodes 5*e* and 6*e* are connected to ground at 7. Base electrode 6*b* is cross-coupled to collector 5*c* through a resistor 8 and a parallel capacitor 9. Base 5*b* is similarly cross-coupled to collector 6*c* through a resistor 10 and a parallel capacitor 11. Base 5*b* is connected through an input gate to an input terminal 48 of stage 1, and thence through a wire 15 to a main input terminal 12 of the counter. This input gate includes a diode 13, a capacitor 14, and a resistor 22 connected between collector 5*c* and the common junction of diode 13 and capacitor 14. Base 6*b* is also connected to input terminal 48 through an input gate including a diode 16, a capacitor 17, and a resistor 23 connected between collector 6*c* and the common junction of diode 16 and capacitor 17. Base electrodes 5*b* and 6*b* are connected through resistors 18 and 19 respectively to a wire 20 which leads to the positive terminal of a biasing battery 21.

Collector 5*c* is connected through a load resistor 24 to a wire 25 leading to the negative terminal of a load supply battery 26. Collector 6c is similarly connected to the wire 25 through a load resistor 27.

The minimum potential of collector electrode 6c is established by a clamp circuit which includes a diode 28, a wire 29 and a source of clamping potential indicated as a battery 30.

The potential of collector electrode 5c is clamped by the action of a similar clamp circuit including a diode 33.

*Operation*

The trigger circuit of each stage has an "off" condition in which the transistor 5 is not conducting and the transistor 6 is conducting. The source of signals connected to input terminal 12 may, for example, have a background of no-signal potential of −5 volts and a signal potential of 0 volt. The clamping arrangements for the collectors 5c and 6c are constructed so that when either transistor is "off," its collector is at a potential of −5 volts. When either transistor is "on," its collector potential is substantially the same as the emitter potential, since the transistor impedance is then very low. The emitters are always at ground potential.

When the trigger circuit of stage 1 is in its "off" condition, the output terminal 49 connected to collector 6c is at 0 volt, which potential is communicated through resistor 23 to the junction between diode 16 and capacitor 17. The base 6b is likewise substantially at 0 volt, because of the low impedance of the transistor, so there is substantially no potential across the diode 16. The input terminal 48, in the absence of an incoming signal, is then at a potential of −5 volts. so that capacitor 17 is charged at a potential of 5 volts, with its upper terminal positive.

In the input gate for transistor 5, which is then "off," the potential of collector 5c (−5 volts) is communicated through resistor 22 to the junction between diode 13 and capacitor 14. The capacitor 14 then has no potential across it, since input terminal 48 is then also at −5 volts. However, base electrode 5b is only slightly positive so that diode 13 has a reverse bias across it of slightly more than 5 volts. This reverse bias is effective to block the next positive signal potential of 5 volts which is received at input terminal 48. That same positive signal potential, however, passes through capacitor 17 and diode 16 and is impressed on base electrode 6b, being aided by the 5 volt potential stored on capacitor 17.

In the zero condition of the counter circuit, all four stages are "off." The trigger stage 1 is shifted from this "off" condition to an "on" condition by the first positive input pulse transmitted through input terminal 48 to the bases 5b and 6b of stage 1. As pointed out above, this first positive input pulse is blocked from transistor 5, but at transistor 6 it swings the base positive and has the effect of cutting off that transistor. When transistor 6 cuts off, its collector electrode 6c swings negatively to the potential established by battery 30 and clamping diode 28, and this negative swing is transmitted through resistor 10 and capacitor 11 to the base 5b, turning the transistor 5 "on." When transistor 5 turns on, its collector 5c swings in a positive sense, and this positive potential is transmitted through resistor 8 and capacitor 9 to base 6b. However, transistor 6 is already "off," so that this positive potential has no effect at that time.

The trigger circuit of stage 1 is now in its "on" condition, with the transistor 6 turned "off" and the transistor 5 turned "on" or conducting. Capacitor 14 is charged to a potential of substantially 5 volts, with its upper terminal positive. There is no potential across diode 13 nor across capacitor 17. Diode 16 is reversely biased with a potential of slightly more than 5 volts.

When a second positive input pulse is transmitted through terminal 12, it passes through input terminal 48 and is blocked from the base 6b of transistor 6, but at base 5b of transistor 5 it is effective to swing the base positive and cut off that transistor. When transistor 5 cuts off, its collector 5c swings negatively, to the potential established by the clamping diode 33. The negative potential is transmitted through resistor 8 and capacitor 9 to the base 6b, and is there effective to turn the transistor 6 "on." When the transistor 6 turns "on," its collector 6c and the output terminal 49 of stage 1 swings in a positive sense, and this positive signal pulse is transmitted through wire 47 to input terminal 48 of stage 2.

In a trigger circuit such as stage 1, the transistor 5 is sometimes spoken of as the counting transistor and the transistor 6 as the transmitting transistor.

Only the positive going pulses reaching the input terminal 48 of any stage are effective to trip that stage. Negative going pulses are blocked by the diodes 13 and 16. In stage 2, at the time the positive signal pulse is received from output terminal 49 of stage 1, transistor 5 is not conducting and transistor 6 is conducting.

In stage 2, the "no-signal" negative potential from output terminal 49 of stage 1 is blocked from the lower terminal of capacitor 17 by a diode 54. However, an equivalent negative potential is supplied to the common junction 53a between diode 54 and capacitor 17, by a connection to the collector electrode 5c of stage 4, said connection including a resistor 53 and a wire 52. Transistor 5 of stage 4 is normally "off," so that collector 5c is normally negative, at the collector clamp potential of −5 volts.

Transistor 5 of stage 4 has an input terminal 56 separate from the input terminal 51 the latter serving transistor 6 only. Terminal 56 is connected through wires 55 and 47 to the output terminal 49 of stage 1. Transistor 5 of stage 4 is normally "off," and its associated diode 13 is reversely biased as in the other stages, so that positive input pulses from the output terminal 49 of stage 1 are not usually effective to produce any response at base 5b of transistor 5 in stage 4.

The first signal received from stage 1 (second signal at terminal 12) is effective at stage 2 to turn transistor 6 "off," so that transistor 5 of stage 2 is switched "on." This produces a negative output signal at the output terminal 49 of stage 2, but stage 3, like the other stages, does not respond to negative input signals.. Stage 2 remains in its "on" condition with its transistor 5 "on" and its transistor 6 "off" until a second input pulse is received from stage 1 (which occurs on the fourth input pulse to terminal 12), at which time stage 2 is again switched, turning transistor 5 "off" and turning transistor 6 "on," and producing a positive output pulse at terminal 49.

Reviewing, the first input pulse to stage 1 produces no positive output signal at its output terminal 49. The second positive pulse to stage 1 produces a positive output pulse from stage 1 to stage 2 and restores stage 1 to its "off" condition. Stage 2 is turned "on" on the second input pulse and remains "on" until the fourth input pulse, which turns it "off" and turns stage 3 "on." It may, therefore, be seen that the three binary trigger stages 1, 2 and 3 will count eight pulses. At the end of the seventh pulse, the stages 1, 2 and 3 are all "on." When the eighth pulse is received, stage 1 turns "off" and transmits a signal to stage 2 which turns "off" and in turn transmits a signal to stage 3, turning it "off." Stage 3 transmits a signal through a wire 50 to an input terminal 51 of stage 4. Note that input terminal 51 of stage 4 serves only the transistor 6 and not the transistor 5 of that stage. The input signal at terminal 51 switches the stage 4, turning the transistor 6 "off" and the transistor 5 "on." The collector 5c of transistor 5 therefore swings in a positive direction, and this change in potential is transmitted through wire 52 and resistor 53 to the junction 53a between capacitor 17 of stage 2 and diode 54.

*Feedback and gate*

Diode 54, resistor 53 and capacitor 17 of stage 2 function as a gate of the type described in U. S. Patent No. 2,580,771, to Harper. More specifically, when stage 4 is "off," the right hand terminal of resistor 53 is clamped negative by diode 33 of stage 4, and that negative potential is communicated to junction 53*a*. Then when a positive signal is received in input terminal 48, that input signal may successfully pass through the diode 54, capacitor 17, and diode 16 to the base 6*b* in stage 2. However, when the right-hand terminal of resistor 53 is swung positive, as it is when stage 4 is switched "on," then junction 53*a* follows to the same positive potential, which is the same potential as the positive signals appearing at terminal 48. The next positive signal is therefore blocked, and is not transmitted through diode 54 to capacitor 17. Resistor 53 slows the rate of change of potential of junction 53*a* sufficiently so that no positive signal passes through capacitor 17 of stage 2 when stage 4 is switched "on."

Note that output terminal 49 of stage 1, in addition to being connected to input terminal 48 of stage 2, is connected through a wire 55 to input terminal 56 and thence to the base 5*b* in stage 4. When stage 4 is "off," a positive signal from stage 1 is without effect at stage 4 since transistor 5 of stage 4 is not conducting.

As a result of the connections just described, when the eighth impulse switches stage 4 "on," the gate in stage 2 is arranged so that it will block the signal from stage 1 which would otherwise switch stage 2 "on" at the tenth input impulse. This output signal from stage 1 on the tenth input impulse, although blocked from stage 2, is transmitted through wire 55 and input terminal 56 to base 5*b* in stage 4, where it is effective to switch that stage "off," producing an output signal at its terminal 49.

While the feedback arrangement shown decimalizes the output of the counter, in that the circuit is caused to produce an output pulse on the tenth input pulse, it will be recognized that other feedback arrangements may be readily made, to produce other modifications of the normal binary output. For example, if diode 54 and resistor 53 are connected in stage 1 instead of stage 2, then the counter produces an output pulse on the ninth input pulse. Alternatively, if diode 54 and resistor 53 are connected in stage 3 instead of stage 2, then the counter produces an output pulse on the twelfth input pulse. If only two stages are used, the feedback may be arranged to produce an output pulse on the third input pulse. In a similar fashion, by selecting properly the number of stages and the particular stage to which the feedback is applied, a counter may be constructed to deliver an output signal on any desired non-binary input pulse.

*Quick-acting carry pulse*

Means are provided for producing the carry output pulse from this counter simultaneously with the tenth input pulse, without waiting for the tenth input pulse to switch through the trigger circuits and clear them. This arrangement may save as much time as 5 microseconds in the operation of the counter circuit. A time of this duration is of substantial importance in the operation of high speed computers.

Connected across the load resistor 27 of transistor 6 in stage 4 is a diode 60 in series with a resistor 61. A carry output terminal 62 is located at the common junction of diode 60 and resistor 61. Also connected to the carry output terminal 62 is a diode 63 whose opposite terminal is connected through wire 55 to the output of stage 1. Another diode 64 is connected between carry output terminal 62 and the wire 15 leading to the signal input terminal 12.

The carry output circuit includes a coupling capacitor 65 connected to terminal 62. The next succeeding circuit, like the present one, is arranged to respond only to positive-going signals passing capacitor 65. Such a positive-going signal occurs only simultaneously with the tenth input signal, as described below.

The diodes 60, 63, 64 and resistor 61 comprise a logical gated carry circuit.

Whenever current flows through any of the diodes 60, 63 and 64, terminal 62 is held positive, and no output signal can be produced. In order to produce an output signal, it is first necessary to cut off the current flow through all the diodes, thereby allowing terminal 62 to swing negative. Then current is passed through one diode, swinging the terminal 12 positive, whereupon an output signal is produced. Current flows through the diode 64 on each input pulse to the counter circuit at the terminal 12. Current flows through the diode 63 whenever the transistor 6 of stage 1 is conducting, and therefore flows after each even numbered pulse and until the following odd numbered pulse is switched through stage 1. Current flows through diode 60 throughout the first eight pulses until the stage 4 switches from its "off" condition to its "on" condition on the eighth pulse, whereupon terminal 49 of stage 4 goes negative. Current continues to flow through diode 63, holding terminal 62 positive, until after the ninth pulse, when stage 1 switches "on." All the current flow through the diodes 60, 63 and 64 is then cut off, and terminal 62 then swings negative, but as noted above, the next succeeding circuit coupled through condenser 65 is not sensitive to negative swings.

When the tenth input pulse is received at terminal 12, it is conducted directly through wire 15 and diode 64, swinging terminal 62 positive, and transmitting a positive pulse through coupling condenser 65.

The tenth input pulse is also effective to trip the stage 1 in the normal manner and the output pulse from terminal 49 of that stage is transmitted through wire 55 to the input terminal 56 of stage 4, where it is effective to trip that stage back to its normal "off" condition. All four of the stages are then restored to their "off" conditions, but note that the output pulse at terminal 62 did not wait for the tripping of stages 1 and 4 to be completed.

While PNP transistors are used in this circuit, it will be readily understood that NPN transistors may be used alternately, providing that all the polarities of the batteries are reversed, and other changes made in accordance with principles well understood by those skilled in the art.

The following table shows by way of example particular values for the potentials of the various batteries and for the impedances of the various resistors and capacitors, in a circuit which has been operated successfully. In some cases, the values are also shown in the drawing. These values are set forth by way of example only, and the invention is not limited to them nor to any of them. The diodes are considered to have substantially no impedance in the forward direction and substantially infinite impedance in the reverse direction:

TABLE I

| | | |
|---|---|---|
| Resistor 8 | ohms | 20K |
| Capacitor 9 | mmf | 680 |
| Resistor 10 | ohms | 20K |
| Capacitor 11 | mmf | 680 |
| Capacitor 14 | mmf | 1000 |
| Capacitor 17 | mmf | 1000 |
| Resistor 18 | ohms | 240K |
| Resistor 19 | do | 240K |
| Battery 21 | volts | 15 |
| Resistor 22 | ohms | 3K |
| Resistor 23 | do | 3K |
| Resistor 24 | do | 3K |
| Battery 26 | volts | 15 |
| Resistor 27 | ohms | 3K |
| Battery 30 | volts | 5 |
| Resistor 34 | ohms | 39K |
| Battery 36 | volts | 45 |
| Resistor 38 | ohms | 100K |
| Battery 39 | volts | 50 |
| Capacitor 42 | mmf | 1000 |
| Resistor 44 | ohms | 3K |
| Resistor 45 | do | 27K |
| Resistor 53 | do | 5K |
| Resistor 61 | do | 7.5K |
| Capacitor 65 | mmf | 1000 |

Figure 2:
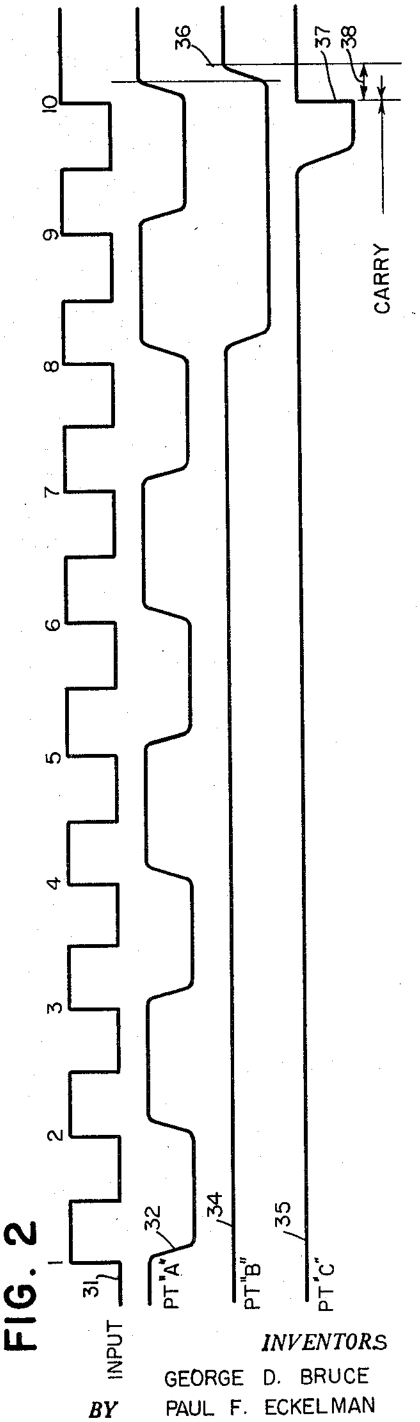
Fig. 2 is a graphical illustration of the potentials, at various points in the decimal counter of Fig. 1.
Figure 3:
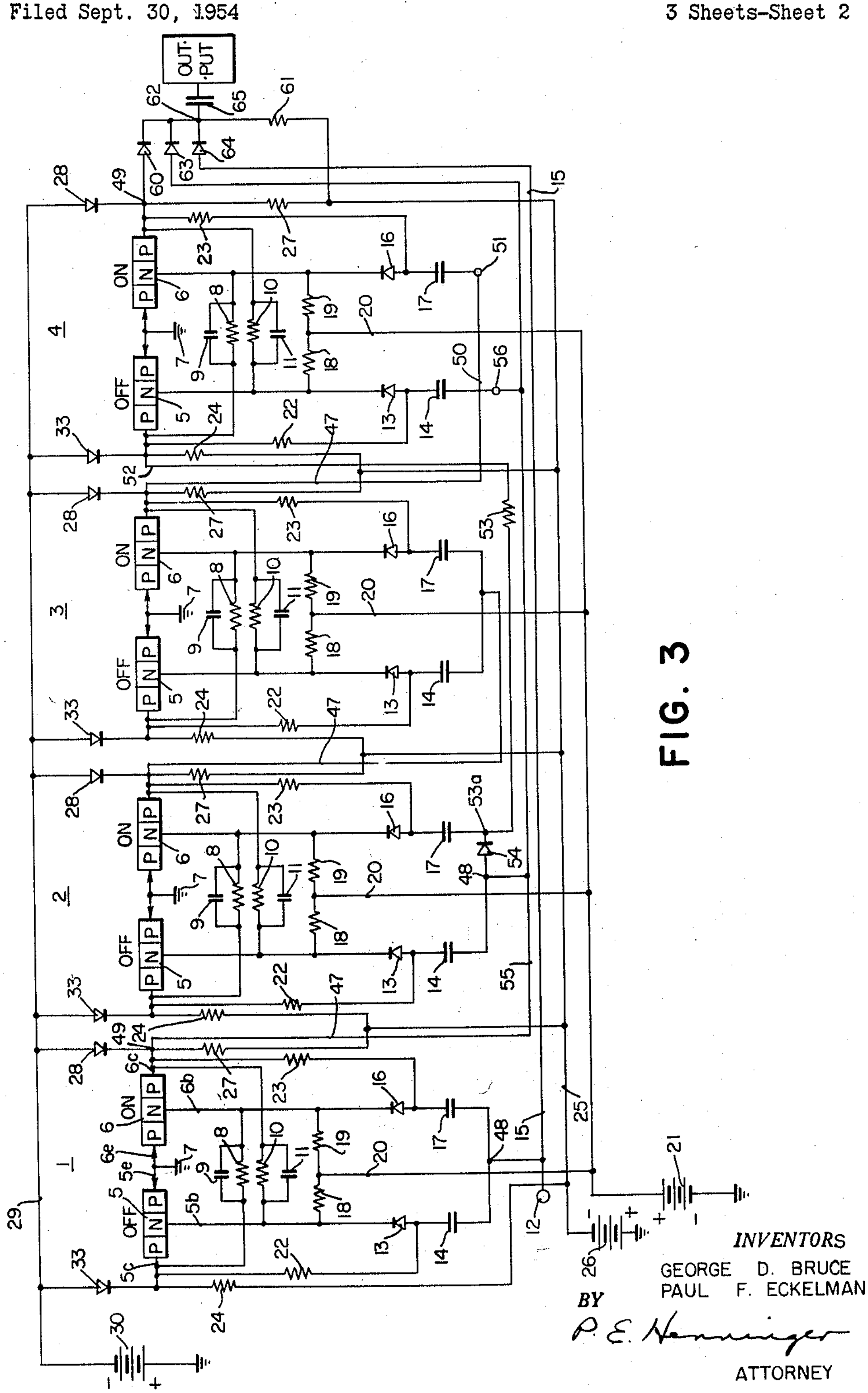
Fig. 3 is a complete electrical wiring diagram of the circuit shown in block form in Fig. 1.

Referring to Fig. 2, the line 31 shows the input signals appearing at terminal 12 in Figs. 1 and 3. The line 32 illustrates the potential at point A in Fig. 1, i. e. at the output of stage 1. The line 34 shows the potential at the point B in Fig. 1, i. e. the output of stage 4. Line 35 illustrates the potential at the output terminal 62.

Note that, if the gated carry circuit were not provided, the output signal would not be produced until the time indicated by the vertical line 36 in Fig. 2. With the gated carry circuit, the output signal is produced simultaneously with the beginning of the tenth input pulse, as indicated at 37 in Fig. 2. There results a saving of time of the magnitude indicated at 38.

FIG. 4

The cascaded counting triggers 1, 2, 3 and 4 of this figure are the same as those in Figs. 1 and 3, as indicated by the use of the same reference numerals. The gated carry logical circuit is somewhat different.

The gated carry circuit of Fig. 4 includes a diode And circuit 39, of conventional form, having one input 40 connected to output A of stage 1 and a second input 41 connected to the output B of stage 4. When input signals are received at both the inputs 40 and 41, the diode And circuit 39 produces an output signal which is transmitted to a power amplifier 42, whose output is connected through a resistor 43 to a junction 44. Resistor 43 forms part of a Harper gate circuit of the type described in detail and claimed in the U. S. Patent to Harper No. 2,580,771, previously mentioned. This gate is generally indicated at 45, and includes, in addition to the resistor 43, a diode 70 and a capacitor 71.

The operation of the gate 45 is such that as long as junction 44 is maintained positive by a potential supplied through resistor 43, then the diode 70 will not pass positive signals going through input terminal 12. Junction 44 is so maintained positive until a signal is received at both inputs 40 and 41 of the diode And circuit 39, which acts through the power amplifier 42 to transmit through resistor 43 a signal effective to swing the potential of junction 44 negative. Thereafter, when the next input signal is received at terminal 12, it passes through diode 70 and capacitor 71 and on into the driven circuit.

FIG. 5

This figure is a block diagram generally similar to Fig. 1, except that the counter circuit is not decimal coded. There is no gate circuit including a resistor 43 and diode 54, as in Fig. 1. The circuit is a strict binary counter, and produces an output pulse at terminal C after a succession of sixteen input pulses.

This counter is provided with a gated carry logical circuit, similar to that of Fig. 1, except that it has five diodes 72, 73, 74, 75 and 76, instead of the three diodes 60, 63 and 64 of Fig. 1. A diode 68 blocks negative pulses from reaching an output terminal 69.

The operation of the circuit of Fig. 5 is analogous to that of Fig. 1, except that there are four stages "on" when the last input signal is received, and all four of them must be turned "off" in order to produce a signal at output terminal C. However, when the four trigger stages are "on," the carry circuit is set up so that when the last signal is received at input terminal 12 it passes immediately through diode 76 and capacitor 65 and diode 68 to output terminal 69.

The four diodes 72, 73, 74 and 75 are required to ensure that no output signal will be transmitted at some earlier input pulse than the sixteenth.

FIG. 6

This figure illustrates the application of the invention to a single stage trigger circuit. The circuit is generally analogous to that of Figs. 1 and 5, except that only two diodes 77 and 78 are provided. Diode 77 is supplied from the output of the trigger stage 1 and diode 78 is supplied from input terminal 12.

The operation of the circuit of Fig. 6 is also analogous to the circuits of Figs. 1 and 5. The left hand terminal of diode 77 goes negative on the first of the two successive input signals, and when the second successive input signal is received, it passes directly through diode 78, capacitor 65 and diode 68, to output terminal 69. The output signal at terminal 69 is produced without waiting for the trigger 1 to trip. While the saving of time is somewhat less in this circuit than in the multiple stage arrangement, there is nevertheless a finite time period which is saved, and which may in some instances be of substantial importance.

While we have shown and described certain preferred embodiments of our invention, other modifications thereof will readily occur to those skilled in the art, and we therefore intend our invention to be limited only by the appended claim.

We claim:

A decimalized binary counter, comprising four binary trigger stages connected in cascade, each switchable from an "off" state to an "on" state and return in response to successive input signals, and requiring a finite time for switching between said states, signal input means for supplying signals to the first binary trigger stage, a normally open gate between the first stage output and the second stage input, a feedback from the fourth stage connected to said gate and effective to close it when said fourth stage switches "on," which occurs only in response to the eighth of a series of input signals, and a carry circuit comprising an output terminal and an And circuit feeding said output terminal and having only three inputs connected respectively to the fourth stage output, to the first stage output and to said signal input means, said And circuit being effective to transmit a signal to said output terminal when and only when said fourth stage is "on," said first stage is "on," and a further signal appears at said signal input means, which occurs immediately upon appearance of the tenth input signal of said series at said signal input means and without elapse of said switching time.

References Cited in the file of this patent

UNITED STATES PATENTS

| | | |
|---|---|---|
| 2,519,184 | Grosdoff | Aug. 15, 1950 |
| 2,531,076 | Moore | Nov. 21, 1950 |
| 2,584,363 | Mumma | Feb. 5, 1952 |
| 2,584,811 | Phelps | Feb. 5, 1952 |

FOREIGN PATENTS

| | | |
|---|---|---|
| 964,113 | France | Jan. 18, 1950 |
| 1,041,803 | France | June 3, 1953 |
| 1,086,430 | France | Aug. 11, 1954 |